(12) United States Patent  
Hansen

(10) Patent No.: US 8,561,835 B2  
(45) Date of Patent: Oct. 22, 2013

(54) DUTCH OVEN HANDLE ASSEMBLY

(75) Inventor: Sheldon Hansen, Riverton, UT (US)

(73) Assignee: Utah Valley University, Orem, UT (US)

( * ) Notice: Subject to any disclaimer, the term of this patent is extended or adjusted under 35 U.S.C. 154(b) by 0 days.

(21) Appl. No.: 13/536,868

(22) Filed: Jun. 28, 2012

(65) Prior Publication Data

US 2013/0001232 A1    Jan. 3, 2013

Related U.S. Application Data

(60) Provisional application No. 61/502,715, filed on Jun. 29, 2011.

(51) Int. Cl.
*B65D 23/10* (2006.01)

(52) U.S. Cl.
USPC ......... 220/759; 220/300; 220/298; 220/573.1

(58) Field of Classification Search
USPC ......... 220/288, 293, 298, 300, 759, 768, 760, 220/573.1; 16/422, 425; 15/145; 206/701
See application file for complete search history.

(56) References Cited

U.S. PATENT DOCUMENTS

| | | | | |
|---|---|---|---|---|
| 119,815 A * | 10/1871 | Brintzinghoffer | .............. | 15/145 |
| 511,769 A * | 1/1894 | Gladding | ........................ | 15/145 |
| 836,555 A * | 11/1906 | Birnie | ........................... | 220/293 |
| 1,134,905 A * | 4/1915 | Prochiaska | .................. | 294/27.1 |
| 1,140,967 A * | 5/1915 | Duncan | ........................ | 220/759 |
| 1,241,890 A * | 10/1917 | Schrader | ...................... | 190/116 |
| 1,763,066 A * | 6/1930 | Rooney | ........................ | 15/235.8 |
| 2,205,535 A * | 6/1940 | Muckenhirn | ................... | 15/145 |
| 2,338,082 A * | 1/1944 | Brewton | ..................... | 220/212.5 |
| 2,537,750 A * | 1/1951 | Gretschel | ...................... | 190/116 |
| 2,599,434 A * | 6/1952 | Crane | ............................. | 16/406 |
| 2,665,822 A * | 1/1954 | Crawford | ...................... | 220/324 |
| 3,009,551 A * | 11/1961 | Kotkins | ........................ | 190/115 |
| 3,065,480 A * | 11/1962 | Sexton | ............................ | 15/172 |
| 3,158,284 A * | 11/1964 | Henchert et al. | ............... | 220/752 |
| 3,278,074 A * | 10/1966 | Yamazaki | ................... | 220/212.5 |
| 3,302,826 A * | 2/1967 | Henchert et al. | ............... | 220/752 |
| 3,384,208 A * | 5/1968 | Renner | ........................... | 16/410 |
| 3,451,590 A * | 6/1969 | Goddard et al. | ................ | 220/761 |
| 3,473,183 A * | 10/1969 | Ercoli et al. | ................. | 15/144.1 |
| 3,484,894 A * | 12/1969 | Fletcher | .......................... | 16/422 |
| 3,559,779 A * | 2/1971 | Lautin et al. | .................... | 16/409 |
| 3,629,894 A * | 12/1971 | Stefany | .......................... | 15/146 |
| 3,656,594 A * | 4/1972 | Marks et al. | .................... | 16/408 |
| 3,707,016 A * | 12/1972 | Smoot | ............................ | 16/442 |
| 3,720,976 A * | 3/1973 | Bailey | .......................... | 15/244.2 |
| 3,790,232 A * | 2/1974 | Alvarez | ........................ | 403/192 |
| 3,793,674 A * | 2/1974 | Kneier | ............................ | 16/409 |
| 3,813,729 A * | 6/1974 | Szabo et al. | .................... | 16/408 |

(Continued)

*Primary Examiner* — Anthony Stashick  
*Assistant Examiner* — Christopher McKinley  
(74) *Attorney, Agent, or Firm* — Bateman IP

(57) ABSTRACT

A Dutch oven with an improved handle assembly is provided. The assembly may include a handle configured to removably engage a receiver on the lid of the Dutch oven. The handle may be used to transport a Dutch oven to a heating source and, once placed in the heating source, removed and stored so that the handle is not subject to heat while the Dutch oven is used for cooking. To remove the Dutch oven from the heating source, the handle may be reinserted into the receiver and used to lift the Dutch oven from the heating source. The Dutch oven may also include one or more retaining members to securely hold the Dutch oven's lid in place.

16 Claims, 6 Drawing Sheets

(56) References Cited

U.S. PATENT DOCUMENTS

| | | | |
|---|---|---|---|
| 3,981,044 A * | 9/1976 | Luebke et al. | 220/759 |
| 4,127,911 A * | 12/1978 | Cupp et al. | 15/210.1 |
| 4,134,173 A * | 1/1979 | Cupp et al. | 15/210.1 |
| 4,155,140 A * | 5/1979 | Janssen et al. | 15/210.1 |
| 4,222,599 A * | 9/1980 | Gale et al. | 294/12 |
| 4,340,990 A * | 7/1982 | Seynhaeve | 16/445 |
| 4,643,326 A * | 2/1987 | Klingler | 220/710.5 |
| 4,831,678 A * | 5/1989 | Dietsche | 15/176.4 |
| 4,958,399 A * | 9/1990 | Toal et al. | 15/245.1 |
| 5,054,159 A * | 10/1991 | Richardson | 15/400 |
| 5,057,346 A * | 10/1991 | Logan | 428/36.5 |
| 5,178,198 A * | 1/1993 | Fitzgerald | 150/107 |
| 5,183,304 A * | 2/1993 | Mair | 294/10 |
| 5,303,445 A * | 4/1994 | Meyers | 15/235.4 |
| 5,314,220 A * | 5/1994 | Clement | 294/10 |
| 5,404,617 A * | 4/1995 | Ambasz | 16/408 |
| 5,462,327 A * | 10/1995 | Quick | 294/27.1 |
| 5,479,675 A * | 1/1996 | Pytlewski | 15/235.4 |
| D368,012 S * | 3/1996 | Dickinson et al. | D8/306 |
| 5,813,504 A * | 9/1998 | Iny et al. | 190/116 |
| D408,709 S * | 4/1999 | Wang | D8/306 |
| 5,992,671 A * | 11/1999 | Wardani | 220/293 |
| RE36,463 E * | 12/1999 | Jarvis | 15/235.8 |
| 6,170,114 B1 * | 1/2001 | Woodnorth et al. | 15/210.1 |
| 6,328,361 B1 * | 12/2001 | Spear | 294/57 |
| 6,434,777 B1 * | 8/2002 | Sutton | 15/114 |
| 6,457,601 B1 * | 10/2002 | Chappell | 220/573.4 |
| 6,752,441 B1 * | 6/2004 | Morris | 294/12 |
| 6,824,180 B2 * | 11/2004 | Tomchak | 294/57 |
| 7,240,403 B1 * | 7/2007 | Richardson | 16/425 |
| 2008/0223222 A1 * | 9/2008 | Palamara et al. | 99/337 |
| 2009/0106942 A1 * | 4/2009 | Dell'Orfano | 16/425 |

* cited by examiner

DUTCH OVEN HANDLE ASSEMBLY

RELATED APPLICATIONS

The present application claims the benefit of U.S. Provisional Patent Application Ser. No. 61/502,715, filed Jun. 29, 2011, which is incorporated hereby by reference in its entirety.

THE FIELD OF THE INVENTION

The present invention relates to Dutch ovens. More specifically, the present invention relates to a Dutch oven with an improved handle assembly.

BACKGROUND

Dutch ovens have been used as cooking vessels for hundreds of years. A Dutch oven is a heavy cooking pot, usually cast iron, with an attached handle and a lipped, tight-fitting lid. Although Dutch oven cooking can be done using a conventional oven or cook top, Dutch oven cooking is often done outdoors using a camp stove, a wood fire, or using charcoal briquettes.

To facilitate placing the Dutch oven into a given heat source, Dutch ovens often include one or more handles fixedly attached to the pot. Traditional Dutch Ovens often included a bale handle, whereas, more modern styled Dutch ovens may have one or more loop handles that can be used to grasp and hold the Dutch oven. One drawback of having a handle that remains attached to the Dutch oven, however, is that the handle is heated by the heat source along with the pot while food is being cooked. Thus, the handle becomes hot, making it difficult to grasp to remove the oven from the heat source.

To remove the Dutch oven from a heat source, a person will often use a glove or pad to insulate their hand from the hot handle. Depending on the temperature of the handle, however, gloves or pad may not provide sufficient insulation making grasping of the handle uncomfortable and/or the person's hand may become burnt. If grasping the handle becomes too painful, the person may even loosen his grip on the handle risking dropping the Dutch oven or spilling its contents.

Alternatively, tools have been used to facilitate removal of Dutch ovens from a heating source, such as a long handled hooked lid remover or long handled pliers. Such tools, however, do not always provide for secure grasping of the Dutch oven or control of the Dutch oven when transporting it from the heat source. Thus a person using a tool to remove or transport a hot Dutch oven may risk injury to herself or himself, or to people nearby, if the Dutch oven is dropped. Furthermore, when camping or cooking outdoors it may be inconvenient to carry additional tools for cooking.

Thus there is a need for a Dutch oven with an improved handle assembly.

SUMMARY OF THE INVENTION

It is an object of the present invention to provide a Dutch oven with an improved handle assembly.

According to one aspect of the present invention, a Dutch oven may include a lid with a receiver thereon and a handle. The handle may removably engage the receiver and be used to move the Dutch oven to and from a heat source.

According to another aspect of the present invention, the handle may be constructed from any suitable heat resistant material.

According to another aspect of the present invention, the receiver of a Dutch oven lid may include arms that form a slot and the handle may slidably engage the slot.

According to another aspect of the present invention, the receiver of a Dutch oven lid may include a recess so that when the handle is removably engaged with the receiver and used to lift the Dutch oven, the handle is disposed in the recess of the receiver.

According to another aspect of the present invention, a Dutch oven pot may have one or more retaining members and the lid may have one or more grooves generally shaped to allow the lid to be lowered on to the pot when the grooves are in alignment with the retaining members. The lid also may include an outer flange which is disposed below the one or more retaining members when the lid is placed on the pot so that rotation of the lid causes the outer flange engage the retaining members to secure the lid to the pot.

These and other aspects of the present invention are realized in a Dutch oven with an improved handle assembly as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
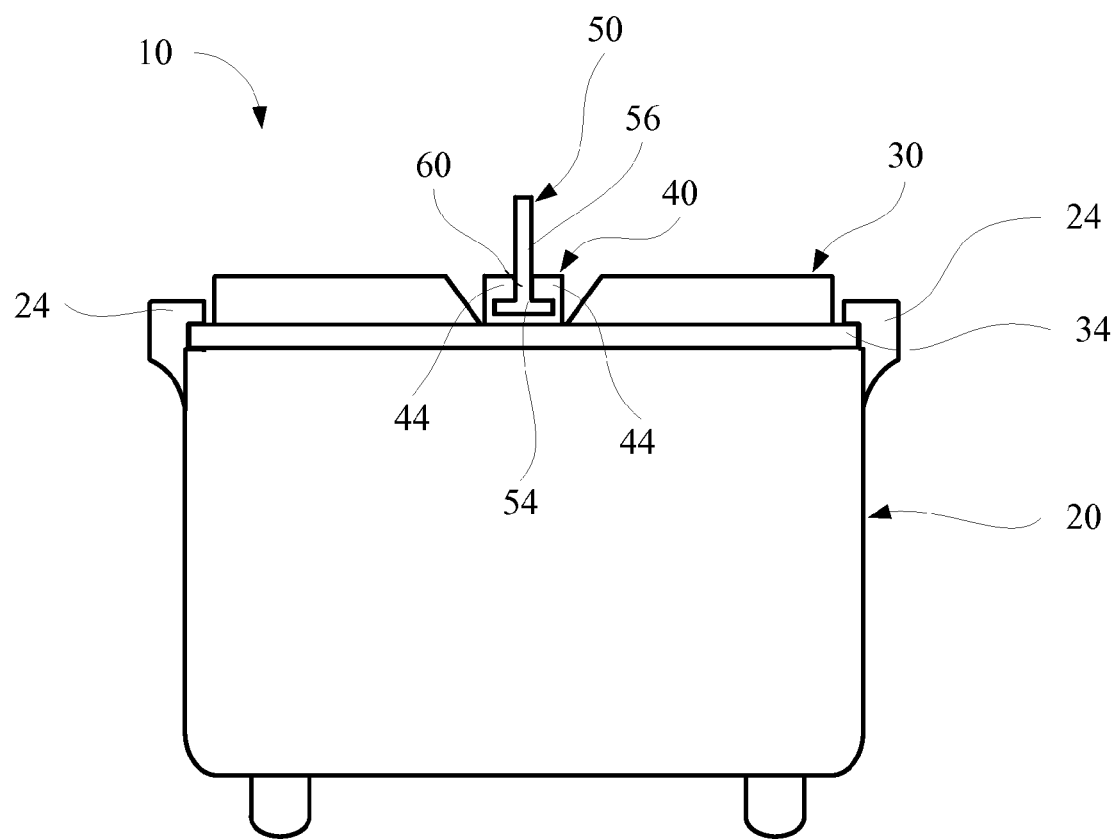
FIG. 1 shows a side view of a Dutch oven with an improved handle assembly made according to principles of the present invention.

Turning now to FIG. 1, a side view of a Dutch oven, generally indicated at 10, with an improved handle assembly made according to principles of the present invention is shown. The Dutch oven 10 may include a pot 20 with one or more retaining members 24. The retaining members are configured to selectively secure lid 30 to pot 20 when the Dutch oven 10 is in use. Lid 30 may include a receiver 40 formed thereon. The receiver 40 may be cast as part of lid 30, however, it will be appreciated that receiver may be formed separately and attached to lid 30 using other methods, such as bolts, screws, welding, etc.

The receiver 40 may be configured to receive a handle 50 which may have a vertical grasping structure 56 disposed on a base 54 which extends generally perpendicular to the grasping structure 56. Handle 50 may be cast iron or may also be constructed from any suitable heat resistant material. For example, handle 50 may be constructed from a heat resistant plastic having a lower rate of thermal transfer via heat conduction to thereby ensure that the handle 50 does not become uncomfortably hot during removal and transport of Dutch oven 10.

Arms 44 of receiver 40 may form an open slot 60 on at least one end of the receiver 40 and be configured to receive handle 50. As shown in FIG. 1, the shape of slot 60 may be generally complimentary to at least a portion of handle 50, which forms a generally upside down T shape, allowing handle 50 to be removably engaged with receiver 40. It will appreciated that handle 50 and slot 60 may be a variety of shapes so long as handle 50 can be removably engaged with receiver 40.

By holding the grasping member 56 and sliding base 54 into engagement with slot 60 lid 30 may be lifted and placed on to pot 20. Lid 30 may include one or more grooves or notches (not shown in FIG. 1) which may align with the one or more retaining members 24 on pot 20 to allow lid 30 to be lowered onto pot 20 until one or more outer flange 34 is disposed below retaining members 24. Handle 50 may then be rotated so that outer flange 34 engages retaining members 24 to secure lid 30 to pot 20. Handle 50 may then be used to place Dutch oven 10 into a heating source. Once Dutch oven 10 is placed in the heating source, handle 50 may be removed from slot 60 so that it will not be exposed to heat while Dutch oven 10 remains in the heating source. Thus, Dutch oven 10 may be safer to transport than prior art Dutch ovens having attached handles.

When it is desired to remove Dutch oven 10 from the heating source, the cool handle 50 may be placed in slot 60 and used to lift Dutch oven 10 from the heating source. Lid 30 may be removed from pot 20 by rotating lid 30 so that the one or more grooves are generally in alignment with the one or more retaining members 24. Lid 30 may then be lifted off of pot 20.

Figure 2:
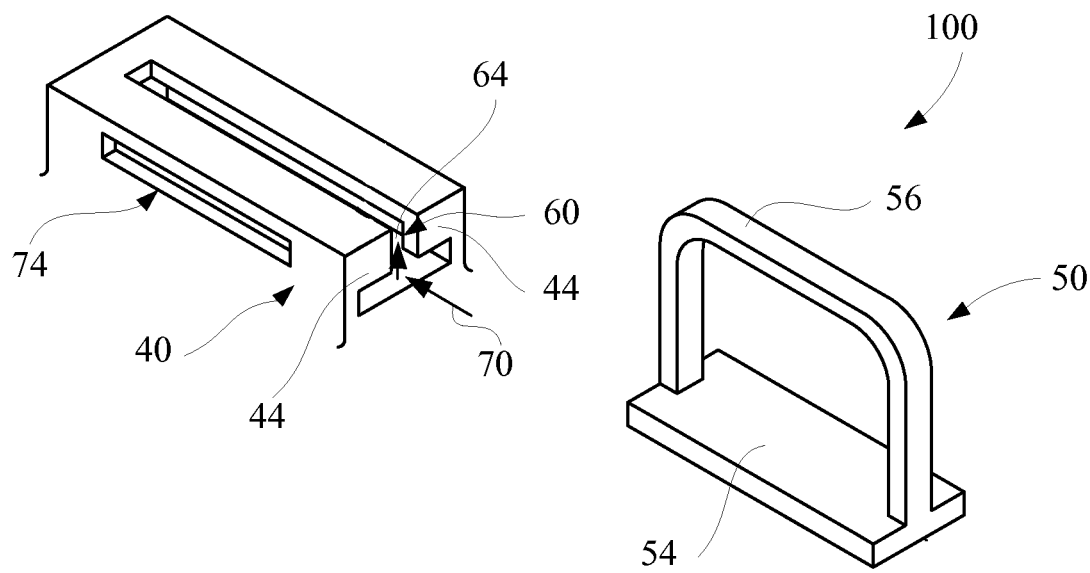
FIG. 2 shows a close-up perspective view of a disassembled Dutch oven handle assembly in accordance with the present invention.
Figure 3:
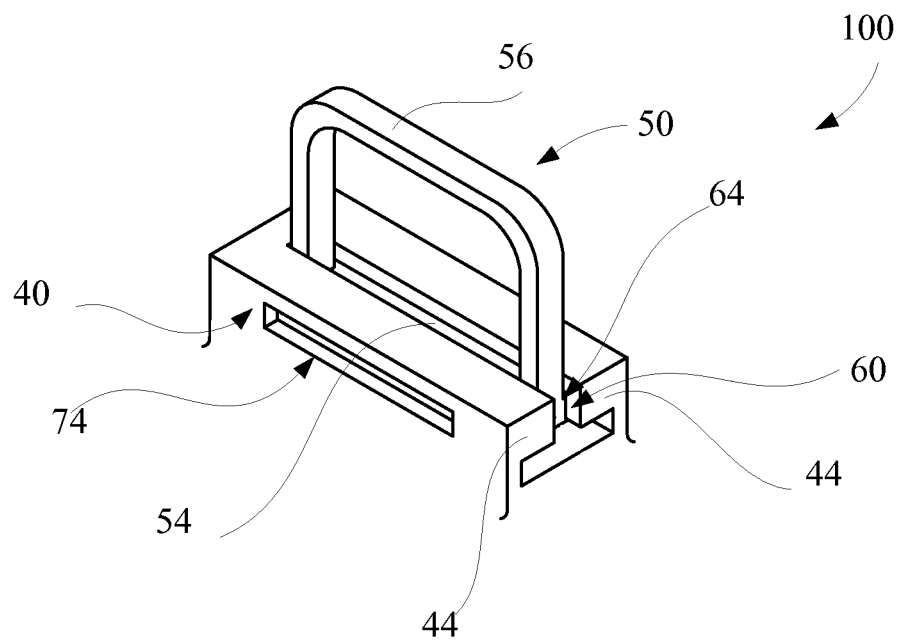
FIG. 3 shows a close-up perspective view of an assembled Dutch oven handle assembly.

Turning now to FIG. 2, there is shown a close-up perspective view of a disassembled Dutch oven handle assembly, generally indicated at 100. The slot 60 formed by arms 44 in receiver 40 is more clearly shown. The handle 50 may be removably engaged with receiver 40 by sliding handle 50 into slot 60 as indicated by arrow 70. According to one aspect of the present invention, a receiver 40 may include a recess 64 so that when the handle 50 is fully inserted in receiver 40 and then used to lift Dutch oven 10, handle 50 nests in recess 64 thereby securing the handle 50 in receiver 40 during transport as can be seen in FIG. 3. Once the Dutch oven is placed in a desired location, such as a heating source, handle 50 can be lowered out of recess 64 and slid back out of slot 60 so that handle 50 is not exposed to heat from the heating source. The receiver 40 further includes one or more ash windows 74 on one or more sides of the receiver and or on the back end of the receiver 40. The slot ash windows 74 are configured to allow ash that has collected in the slot 60 to be removed by a user or be pushed out by the handle 50 or handle base 54. This allows the slot 60 to remain free of obstruction for ease of insertion of the handle 50.

Figure 4:
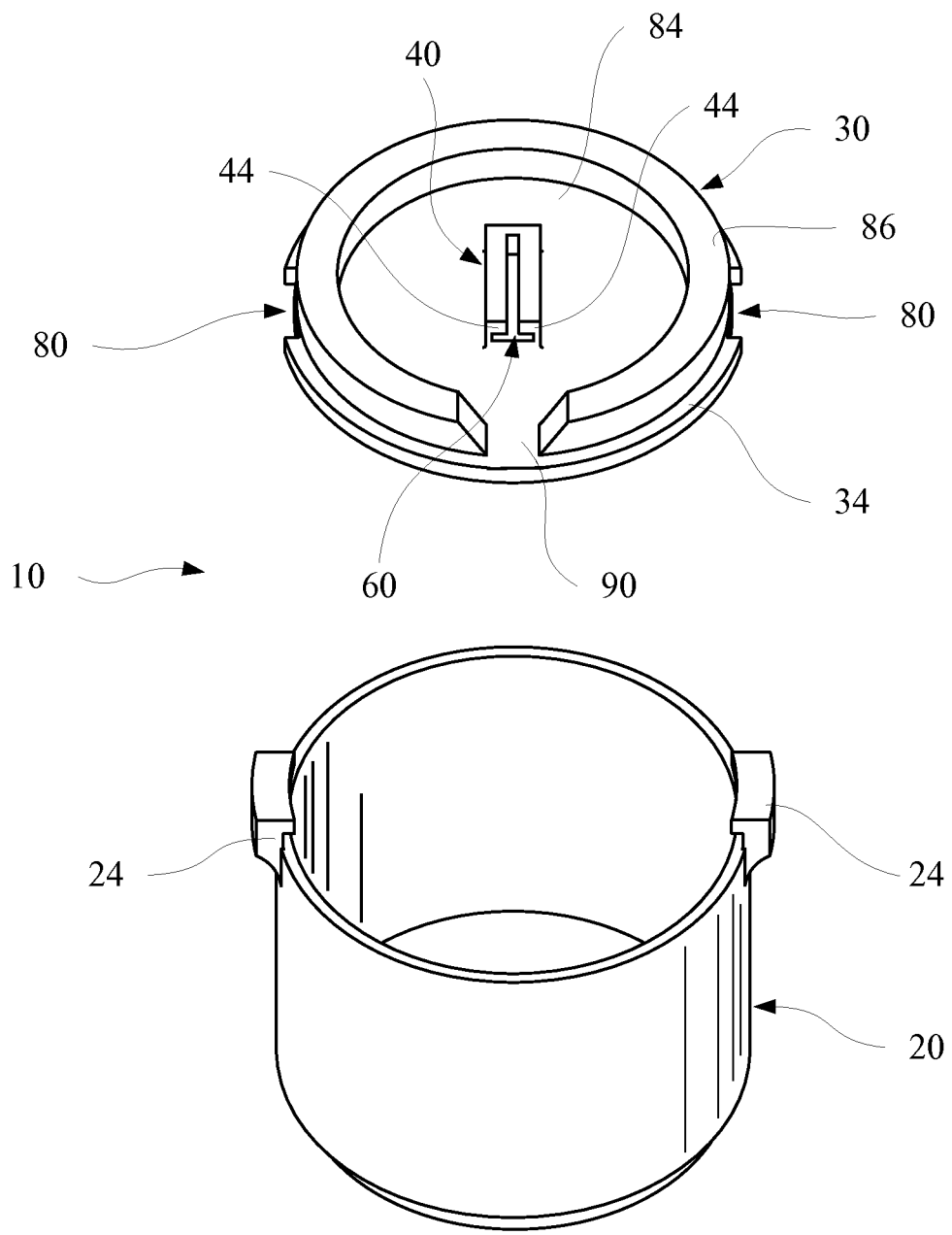
FIG. 4 shows a perspective view of a Dutch oven of the present invention with the lid removed.
Figure 5:
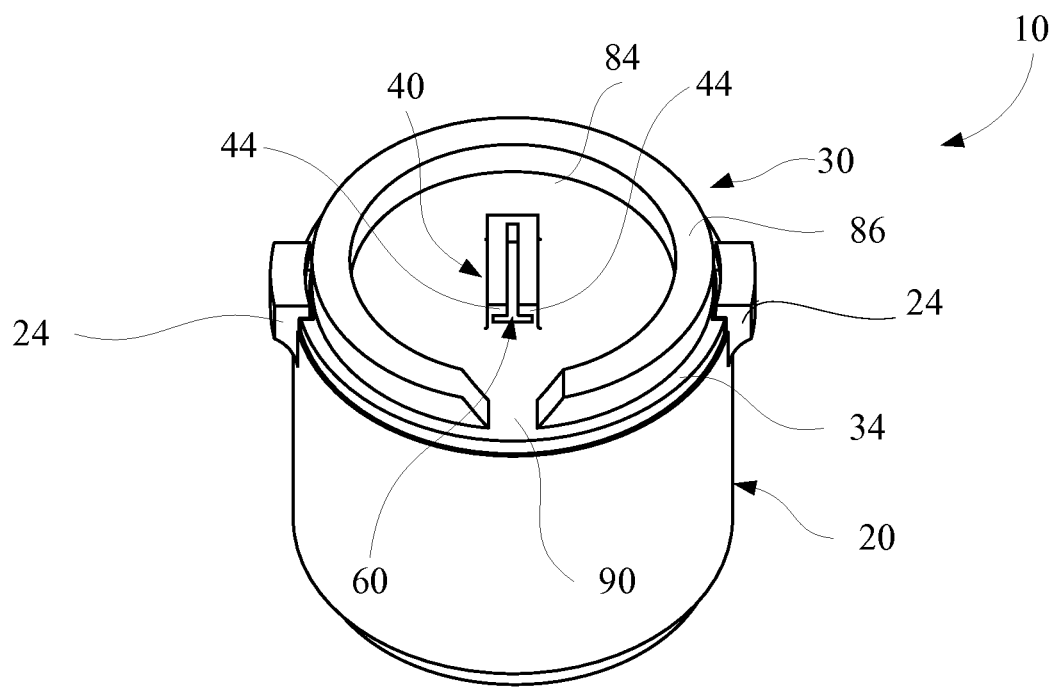
FIG. 5 shows a perspective view of a Dutch oven of the present invention with the lid placed over the retaining members of the pot.
Figure 6:
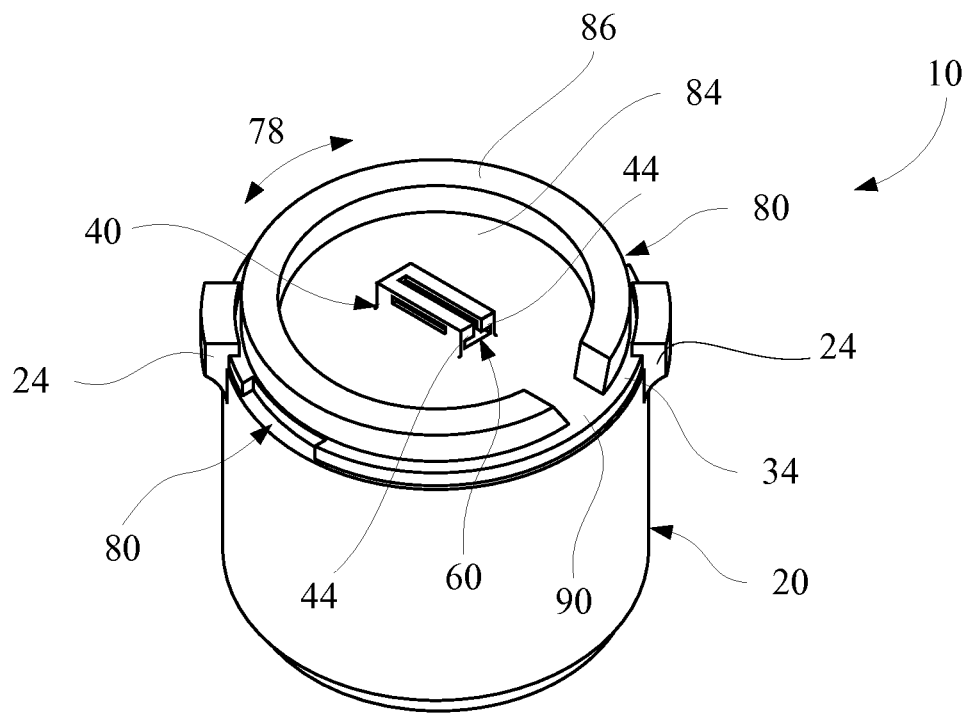
FIG. 6 shows a perspective view of a Dutch oven of the present invention with the lid turned at about a 45 degree angle relative the retaining members of the pot.

FIGS. 4 through 6 show how the lid 30 of a Dutch oven 10 of the present invention may be secured to pot 20. Lid 30 may include one or more grooves or notches 80 in flange 34 generally shaped so that lid 30 may be placed on to a pot 20 having one or more retaining members 24, as is shown in FIG. 5. Lid 30 may have an outer flange 34 which is disposed below the one or more retaining members 24 when lid 30 is placed on to pot 20 with the grooves or notches 80 aligned with the one or more retaining members 24. Rotation of lid 30 by about 45 degrees relative to the one or more retaining members 24, as indicated by arrow 78 (FIG. 5), once the lid 30 has been placed on the pot 20, moves outer flange 34 into engagement with the one or more retaining members 24. When outer flange 34 and the one or more retaining members 24 are engaged, lid 30 is secured to pot 20 and Dutch oven 10 may be transported by engaging handle 50 (FIGS. 1-3) in slot 60 of receiver 40. It will be appreciated that rotating the lid less than 45 degrees or more than 45 degrees may also allow for engagement of the outer flange 34 of lid 30 with the one or more retaining members 24, as engagement may occur when the grooves 80 are no longer aligned with the retaining members 24.

In one embodiment, as shown in FIGS. 4-6, the lid 30 has an interior surface 84 recessed below rim 86 disposed radially outward from the receiver 40. The recessed interior surface 84 allows a heat source to be maintained on the top of lid 30, thereby providing further heat to the contents of pot 20. For example, the recessed interior surface 84 can hold charcoal briquettes, wood, and hot coals, and recessed interior surface also prevents ashes or the heat source from falling off while moving the Dutch oven or lid, and prevents ashes or the heat source from spilling over the edge of lid 30 and entering the pot 20 when lid 30 is removed from pot 20 with the use of the handle 50. The recessed interior surface 84 may also be configured to allow additional Dutch ovens 10 to be stacked on top of one another with the handle 50 engaged in slot 60. The recessed interior surface 84 provides the necessary clearance for stacking. The rim 86 of the lid 30 may also have a notch 90 formed therein to allow any contents of the recessed interior surface 84, such as ashes, to be cleaned out of the recessed interior surface 84 without the need to remove the lid 30 from the pot 20 or turn the lid 30 upside down or at an angle at the risk of burning the person cleaning the lid 30. The notch 90 may be only as deep as the recessed interior surface 84. In another possible embodiment (not shown), the rim 86 and flange 34 are one and the same, i.e. recessed interior surface 84 is recessed below the upper surface of flange 34.

After Dutch oven 10 has been placed in a heating source, the handle may be removed from slot 60 in receiver 40 and stored away from the heating source to ensure that it remains cool and easy to grasp for later removal of Dutch oven 10 from the heating source. To remove the Dutch oven 10 from the heating source, the cool handle 50 may be reinserted into slot 60 and used to lift the Dutch oven 10.

Figure 7:
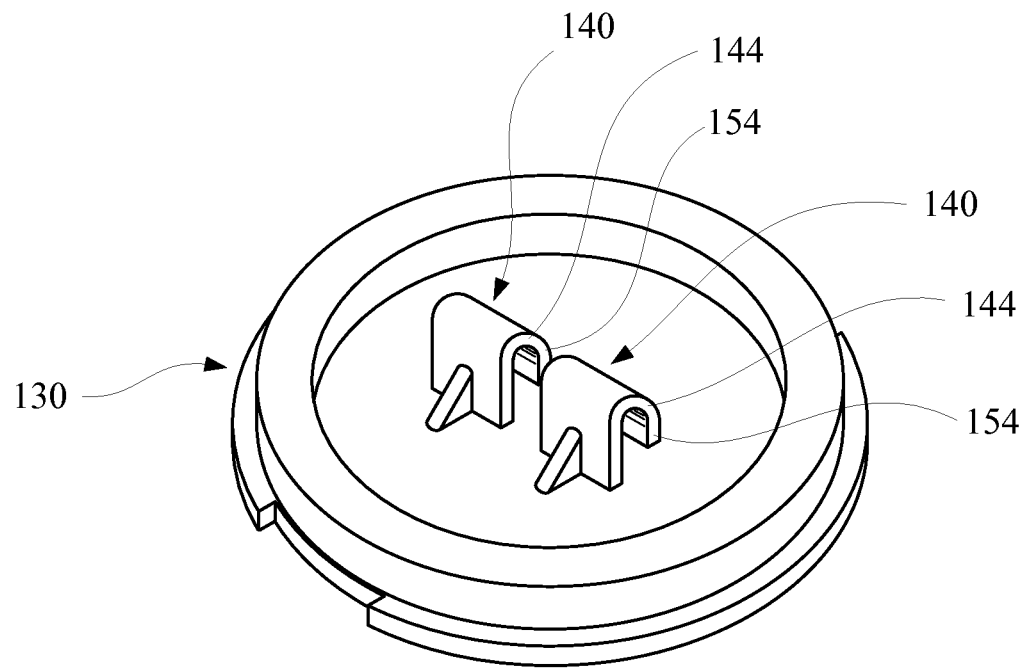
FIG. 7 shows a perspective view of a Dutch oven handle assembly and lid in accordance with the present invention.
Figure 8:
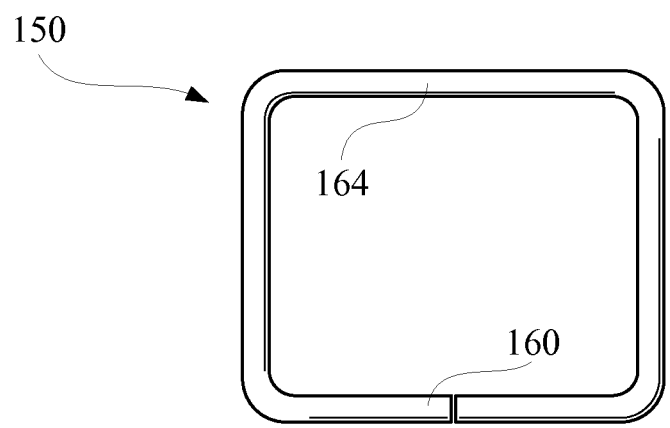
FIG. 8 shows a side view of a removable Dutch oven handle in accordance with the present invention.
Figure 9:
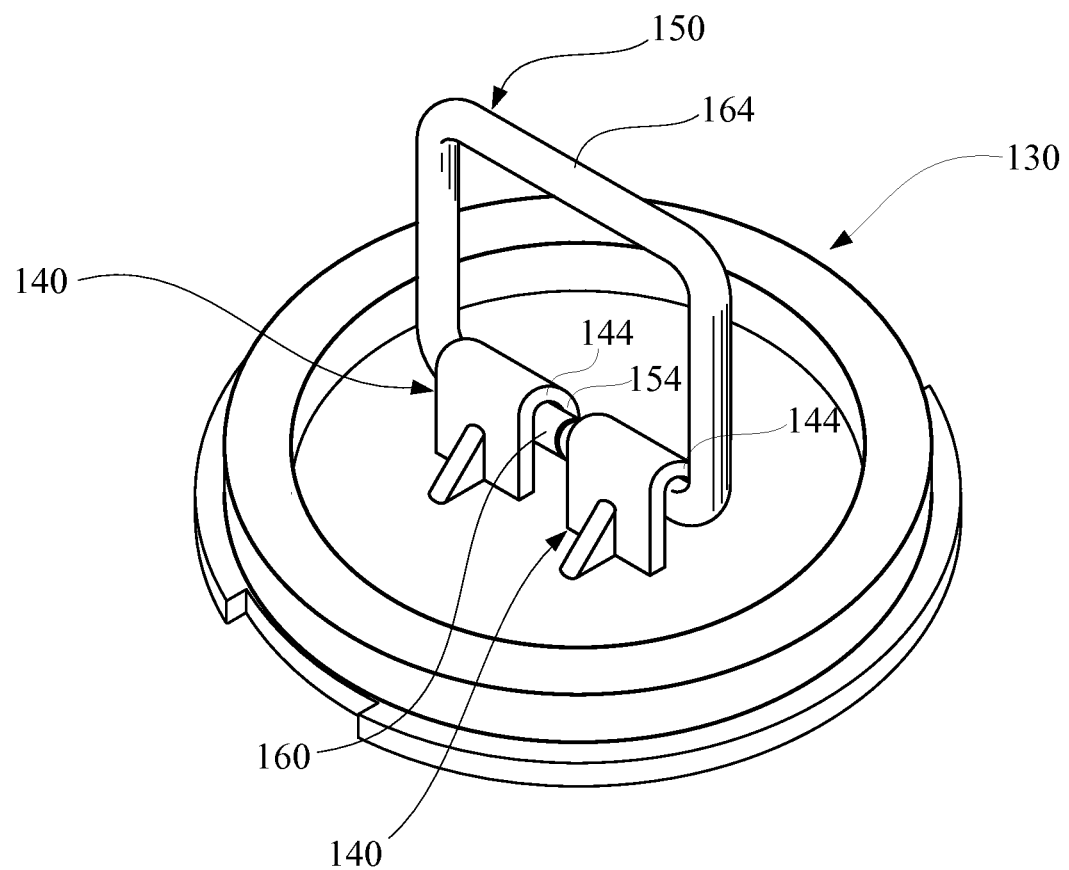
FIG. 9 shows a perspective view of a Dutch oven handle assembly and lid in accordance with the present invention.

FIGS. 7-9 show another embodiment of the present invention wherein a lid 130 has one or more receivers 140 configured to receive and engage a removable handle 150. Receivers 140 include an arm 144 extending over lid 130 to receive and engage handle 150, with a lip 154 on the end of the arm 144 for securing the handle 150 under or within arm 144. The lip 154 creates a groove underneath the arm 144 for engaging and securing the handle 150 in receiver 144. In one embodiment, as shown in FIGS. 7-9, the shape of the receivers 140 may be a hook, but it should be appreciated that the shape of the receivers 140 may be any shape that engages a handle as described herein. The receivers 140 may be formed as part of the lid 130 when the lid 130 is cast, or may be attached separately, such as by screw, bolt, or other fastening device known to those of skill in the art.

Handle 150 generally comprises any device having a lower portion 160 designed to engage with receivers 140, and a grasping structure 164 for a person to grasp. For example, the figures show a handle 150 in the shape of a rectangle, wherein the lower portion 160 of the rectangle engages in the receivers 140, allowing a user to grasp the handle 150 by the grasping structure 164 and move the lid 130 and/or the Dutch oven. Handle 150 may be cast iron or may also be constructed from any suitable heat resistant material. For example, handle 150 may be constructed from a heat resistant plastic having a lower rate of thermal transfer via heat conduction to thereby ensure that the handle 150 does not become uncomfortably hot during removal and transport of Dutch oven 10.

As shown in FIG. 9, handle 150 can be engaged in receivers 140 by placing the lower portion 160 below the grooves of the receivers 140 and then lifting the handle 150, by using the grasping structure 164, so that the lower portion 160 engages in the grooves. The handle 150 can then be used to lift and transport the lid 130, and if the 130 lid is secured to the pot as described above by retaining members, then the entire Dutch oven. It will be appreciated that handle 150 and receivers 140 may be a variety of shapes so long as handle 150 can be removably engaged with receiver 140.

There is thus disclosed a Dutch oven with an improved handle assembly. It will be appreciated that numerous changes may be made to the present invention without departing from the scope of the claims.

What is claimed is:

1. A Dutch oven comprising a handle assembly having a lid with a receiver configured for receiving a handle, and a handle for removably engaging the receiver, the receiver having an ash window for removing ash from the receiver while inserting the handle, the receiver having a slot having a generally complimentary shape to a shape of the handle, and wherein the slot has a bottom portion and wherein the receiver includes a recess above the bottom portion of the slot such that the handle moves upwardly into the recess, the receiver substantially surrounding the recess so that the handle cannot be withdrawn from the receiver while it is disposed in the recess.

2. The Dutch oven of claim 1, wherein the shape of the slot is generally an upside down T shape.

3. The Dutch oven of claim 1, wherein the handle is slidably engaged with the receiver.

4. The Dutch oven of claim 1, wherein the handle is cast iron.

5. The Dutch oven of claim 1, wherein the Dutch oven further comprises a pot having at least one retaining member.

6. The Dutch oven of claim 5, wherein the lid comprises an outer flange and at least one groove having a generally complimentary shape to the at least one retaining member, and wherein the lid may be lowered on to the pot by aligning the at least one groove with the at least one retaining member so that the top plane of the outer flange of the lid is disposed below the at least one retaining member.

7. The Dutch oven of claim 6, wherein the outer flange is rotatably engageable with the at least one retaining member.

8. The Dutch oven of claim 7, wherein the outer flange is engaged with the at least one retaining member by rotating the lid until the groove is not aligned with the at least one retaining member.

9. The Dutch oven of claim 1, wherein the receiver has an arm configured to engage a handle placed under the arm.

10. The Dutch oven of claim 9, wherein said receiver is the shape of a hook.

11. A Dutch oven, comprising:
a pot having one or more retaining members;
a lid having an outer flange adapted to engage beneath the one or more retaining members by rotation of the lid to thereby secure the lid to the pot; and
a handle removably engageable with the lid, the handle removably engaging the lid in a linear sliding motion such that the handle can be used to rotate the lid without changing the engagement between the handle and the lid, and
wherein the lit has a receiver for receiving the handle, the receiver having a slot having a generally complimentary shape to a shape of the handle, and wherein the slot has a bottom portion and wherein the receiver includes a recess above the bottom portion of the slot such that the handle moves upwardly into the recess, the receiver substantially surrounding the recess so that the handle cannot be withdrawn from the receiver while it is disposed in the recess.

12. The Dutch oven of claim 11, further comprising a removable handle, and wherein said lid includes one or more receivers for receiving said removable handle.

13. The Dutch oven of claim 11, further comprising a groove in the outer flange corresponding to the one or more retaining members and adapted to allow the lid to fit on the pot so that the outer flange is disposed beneath the one or more retaining members and can be engaged with said one or more retaining members by rotating the lid until the groove is unaligned with said one or more retaining members.

14. A Dutch oven comprising:
a pot formed from cast iron having retaining members disposed on the pot for selectively engaging a lid to hold the lid to the pot;
a lid formed from cast iron having a non-annular circumference defining a plurality of notches formed in the circumference for allowing the lid to be placed on the pot by aligning the notches with the retaining members and a flange extending beyond the notches for engaging the retaining members by rotation of the lid, the lid further comprising a receiver for receiving a removable handle; and
a handle slidable into the receiver to enable the lid and the pot to be lifted by the handle; and wherein the handle engages the receiver and is secured therein without requiring rotation of the handle or the lid to thereby facilitate rotation of the lid by the handle to selectively engage the flange of the lid with the retaining members of the pot to secure the lid to the pot and thereby enable both the lid and the pot to be carried by the handle, and
wherein the receiver includes a recess formed therein for receiving a portion of the handle, the recess being formed in an upper portion of the receiver such that the handle must be inserted into the receiver and lifted to be disposed in the recess, and wherein the receiver defines the recess so that the handle cannot be slid out of the recess without being moved downwardly.

15. The Dutch oven of claim 14, wherein the lid includes a rim substantially circumscribing the lid so as to defined a recessed surface inside of the rim on the lid; and wherein a notch is formed in the rim to allow ashes to pass from the recessed surface.

16. The Dutch over on claim 14, wherein the receiver comprises an ash window for removing ash from the receiver as the handle is inserted into the receiver.

* * * * *